United States Patent [19]
Wakamatsu et al.

[11] Patent Number: 5,914,168
[45] Date of Patent: Jun. 22, 1999

[54] MAGNETIC RECORDING MEDIUM AND MAGNETIC DISC DEVICE

[75] Inventors: Hiroaki Wakamatsu; Katsuhide Sone; Kiyoshi Yamaguchi, all of Kawasaki; Yoshihiro Mitobe, Higashine; Yoshito Kitamoto, Kawasaki, all of Japan

[73] Assignee: Fujitsu Limited, Kawasaki, Japan

[21] Appl. No.: 08/517,757

[22] Filed: Aug. 22, 1995

[30] Foreign Application Priority Data

Sep. 30, 1994 [JP] Japan .................................. 6-237605

[51] Int. Cl.$^6$ ...................................................... G11B 5/66
[52] U.S. Cl. .................. 428/65.3; 428/65.5; 428/65.7; 428/141; 428/336; 428/694 T; 428/694 TP; 428/694 TR; 428/694 TS; 428/694 TC; 428/694 SG; 428/900
[58] Field of Search .................. 428/694 T, 694 TP, 428/694 TR, 65.3, 65.5, 65.7, 694 TS, 694 TC, 694 SG, 141, 336, 900

[56] References Cited

U.S. PATENT DOCUMENTS

| | | | |
|---|---|---|---|
| 5,029,317 | 7/1991 | Kawai et al. ........................... 360/131 |
| 5,079,062 | 1/1992 | Masuda et al. ........................ 428/65.4 |
| 5,082,709 | 1/1992 | Suzuki et al. ........................... 428/65.4 |
| 5,202,810 | 4/1993 | Nakamura et al. ..................... 360/135 |
| 5,236,791 | 8/1993 | Yahisa et al. ...................... 428/694 TP |
| 5,316,844 | 5/1994 | Suzuki et al. ........................... 428/323 |
| 5,413,835 | 5/1995 | Ikeda ...................................... 428/141 |
| 5,427,867 | 6/1995 | Kogure et al. .......................... 428/611 |
| 5,470,636 | 11/1995 | Wakui et al. ............................ 428/141 |
| 5,550,696 | 8/1996 | Nguyen .................................. 360/135 |
| 5,586,040 | 12/1996 | Baumgart .......................... 364/474.08 |
| 5,656,349 | 8/1997 | Gomi ..................................... 428/65.3 |

FOREIGN PATENT DOCUMENTS

| | | |
|---|---|---|
| 60-195738 | 10/1985 | Japan . |
| 2-23517 | 1/1990 | Japan . |
| 2-137120 | 5/1990 | Japan . |
| 2-149917 | 6/1990 | Japan . |
| 3-73419 | 3/1991 | Japan . |
| 3137824 | 6/1991 | Japan . |
| 4-137219 | 5/1992 | Japan . |

OTHER PUBLICATIONS

"Characterization of Lubricated States on Carbon Coated Media by Low energy photoelectron Spectroscopy Method in Ambient atmosphere" Journal of Applied Physics 69(1991) Jun. 15, No. 12, Nishimori et al.

*Primary Examiner*—Leszek Kiliman
*Attorney, Agent, or Firm*—Greer, Burns & Crain, Ltd.

[57] ABSTRACT

A magnetic recording medium able to cope with low flying height of the magnetic head in a CSS system and having fine surface roughness, wherein (1) a metal layer having columnar protrusions formed by the filming of Ti or the like or (2) a resin layer or glass resin layer having irregularly distributed through-holes are provided on the substrate of a magnetic recording medium to impart roughness (texture).

28 Claims, 11 Drawing Sheets

MAGNETIC RECORDING MEDIUM AND MAGNETIC DISC DEVICE

BACKGROUND OF THE INVENTION

1. Field of the Invention

The present invention relates to a magnetic recording medium, more specifically, a magnetic recording medium having excellent friction and sliding properties and used in a contact-start-stop (CSS) system, and to a magnetic disc device using the same.

2. Description of the Related Art

In recent years, as the amount of the information processed in computer systems increases, the information to be recorded in a magnetic disc device has increased so that the device must have a more compact size and larger capacity and, also, the device is required to have a higher recording density. To cope with this tendency, efforts have been made to improve the device as a whole, such as a magnetic head, a magnetic recording medium, a head positioning mechanism and a signal processing circuit.

In a current disc device, a CSS (contact-start-stop) system (in which a magnetic head is in contact with a medium when the device is off, and the magnetic head flies above the disc surface when the disc rotates) surface when the disc rotates, is used. In this system, if the surface roughness and the lubricant film thickness of the medium are not appropriate, a head adsorption phenomenon, where a head and a medium are bonded to each other, is brought about when the disc device is off.

Accordingly, it is important for the medium to have an appropriate surface roughness. At present, the surface is mechanically roughened using a lapping tape or free abrasives.

To achieve a higher density, one important factor to increase the recording density is to decrease the distance between the magnetic head and the medium, i.e., the head floating height. A low floating height of the magnetic head causes an increase in the probability of a collision between a magnetic head and a magnetic recording medium and eventually a head crash wherein recorded information is lost. To avoid this, the surface roughness of a medium has been rendered low. However, in the current circumstances, where the head floating height is reduced to as low as about 0.1 μm, a fine and uniform roughness over the entire surface of the medium cannot be obtained by a mechanical surface roughening method.

Thus, methods for attaining a surface roughness of the medium by means other than mechanical means have been proposed in, for example, Japanese Unexamined Patent Publication (Kokai) Nos. 3-73419 and 2-137120. In Japanese Unexamined Patent Publication (Kokai) No. 3-73419, a roughness is provided on the medium surface by forming a film of a low melting point metal in the form of islands on the surface of a substrate. In Japanese Unexamined Patent Publication (Kokai) No. 2-137120, a surface roughness of the medium is provided by forming a protective film containing fine particles.

However, in the case of Japanese Unexamined Patent Publication (Kokai) No. 3-73419, the size and density of islands in the film largely depend on the temperature and the surface condition of the substrate at the time of forming the film. Depending upon the kind of substrate, an upper limit of the allowable temperature of the substrate exists and a desired film in the form of islands may not be obtained. Further, although the difference in the surface condition may be eliminated by forming an island film after forming an undercoat film on a substrate, the application of the undercoat film causes an increase in cost by requiring an additional device or target. On the other hand, in the case of Japanese Unexamined Patent Publication (Kokai) No. 2-137120, fine particles may be removed from the protective layer due to the sliding of the head and may enter between the head and the medium, which may give rise to a head crash. In addition, the smaller the size of the fine particles, the more difficult the production thereof and the worse the dispersibility. The difficulty in making the particles smaller throws the effort for achieving a lower flying height into difficulties.

SUMMARY OF THE INVENTION

In order to solve the above problems, the magnetic recording medium is constructed such that a layer having a non-flat surface selected from the following layers A) to F) is provided on a non-magnetic substrate or any of the layers constituting a magnetic recording medium on a non-magnetic substrate. In a preferred embodiment, the non-flat surface layer is provided on a non-magnetic substrate, on which an undercoat layer, a recording layer, a protective layer and a lubricating layer are formed in sequence.

A) A metal layer having irregularly distributed columnar protrusions on the surface thereof in which the columnar protrusions are different from the other flat portion in the crystalline structure or the orientation thereof.

B) A metal layer of irregularly distributed columnar protrusions.

C) A resin layer having irregularly distributed through-holes.

D) A resin layer with an irregularly distributed ring pattern.

E) A glass resin layer having irregularly distributed through-holes.

F) A glass resin layer with an irregularly distributed ring pattern.

According to the present invention, a metal layer having columnar protrusions or a resin or glass resin layer having through-holes is provided at least either on a non-magnetic substrate or on any of the layers constituting the magnetic recording medium, by which a medium having a suitable surface roughness can be easily formed even if the substrate temperature is restricted, and satisfactory friction properties of the medium can thus be realized. Moreover, by providing an inorganic oxide film or an amorphous or highly crystalline metal/alloy film on the medium comprising the non-flat layer between the substrate and the recording layer, a medium with excellent friction and anti-abrasive properties and having satisfactory magnetic recording properties can be obtained.

DETAILED DESCRIPTION OF THE INVENTION

The present inventors have found that when a Ti film is formed under specific film forming conditions, irregular protrusions are formed on the surface of the deposited Ti film, the protrusions are columnar and irregularly distributed, the crystal orientation of the closed-packed hexagonal lattice (hcp) is different between the flat portion and the protruding portions (hcp structure with a crystal grain size of about 50 nm in the protruding portions and the cubic structure with a crystal size of about 100 nm in the flat portion; the c axis is randomly orientated in the flat portion and the c axis is vertically orientated in the protruding portions), and the columnar protrusions generated due to difference in the orientation of crystals also appeared in the case of metals other than Ti, such as Cr. The columnar protrusions can be controlled to have a size of from 0.2 to 20 µm and a height of 50 nm or less, preferably from 5 to 50 nm, therefore, they are most suitable for the object of the present invention. The size of the columnar protrusions is from submicron size to about 10 µm, preferably from 0.5 to 5.0 µm, and the protruding portions account for from 5 to 80%, preferably from 10 to 60% of the surface area.

Figure 1:
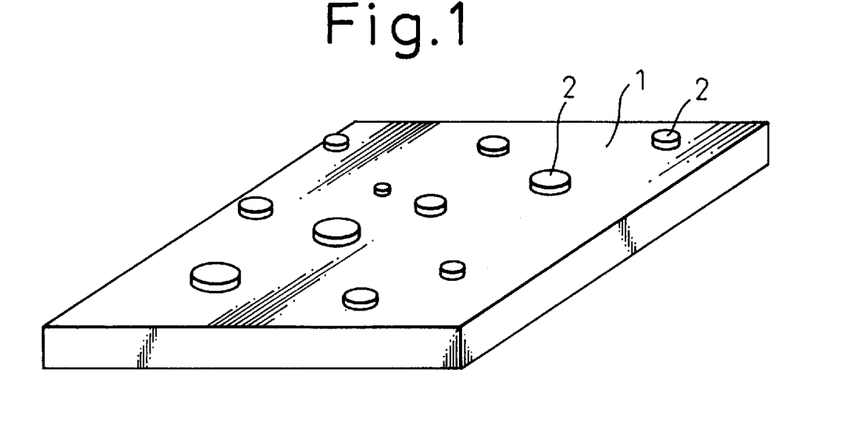
FIG. 1 is a perspective view of a Ti film having columnar protrusions.
Figure 2:
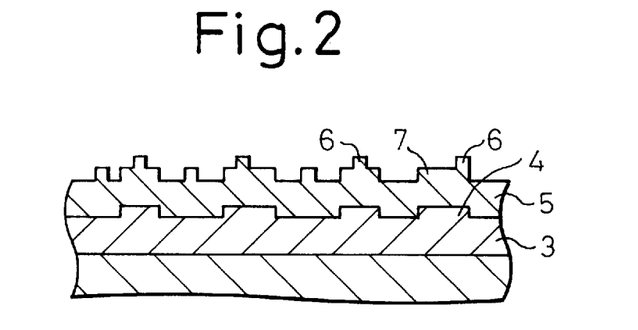
FIG. 2 shows a multilayer Ti layer.
Figure 3:
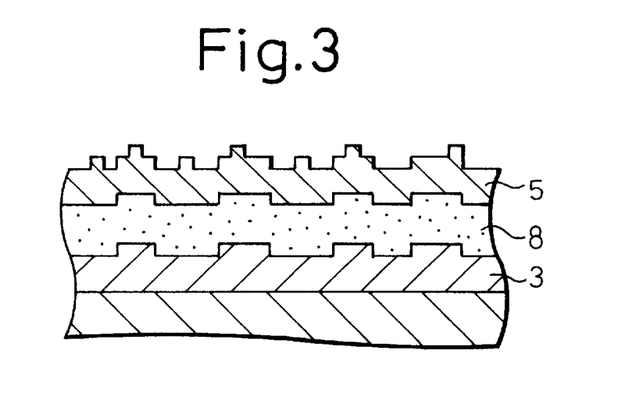
FIG. 3 shows a foreign layer inserted between multilayer Ti layers.

In FIG. 1, columnar protrusions 2 appearing on a Ti layer 1 are perspectively illustrated. The size, height, and density of the columnar protrusions can be varied by changing the temperature for heating the substrate, the sputtering power, the sputtering gas pressure or the amount of deposited Ti film. Therefore, as shown in FIG. 2, when a lower Ti film 3 is formed under first film-forming conditions to form columnar protrusions 4 having a first size and an upper Ti film 5 is then formed under second film-forming conditions to form columnar protrusions 6 having a second size, the columnar protrusions 4 of the lower Ti film 3 affects the upper Ti film 5 and, hence, the columnar protrusions 6 having a first size added to a second size can be interspersed on the upper Ti film 5. In this case, however, the columnar protrusions 7 having a first size present on the upper Ti film 5 have the same crystalline orientation or the same crystal lattice as the flat part. As a modification of this embodiment a layer 8 made of a metal other than Ti may be interposed between the lower Ti film 3 and the upper Ti film 5 (FIG. 3).

Figure 4:
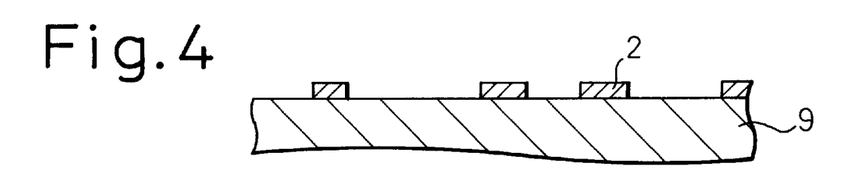
FIG. 4 shows a Ti layer in which only columnar protrusions remain.

The object of the present invention can also be accomplished by keeping the remaining columnar protrusions 2 only by removing the flat portion by etching, applied over the entire surface of a metal layer having columnar protrusions provided on a substrate 9 (FIG. 4).

The film formation may be conducted by sputtering or vacuum evaporation but it is preferably conducted by DC magnetron sputtering.

The film thickness is from 20 to 200 nm, preferably from 50 to 100 nm. The film thickness is a factor for determining the height of the columnar protrusion and for example, a 50 nm-thick Ti film provides protrusions of about 10 nm in height.

Further, according to the present invention, a resin film or a glass resin film having irregularly distributed through-holes can be used as the non-flat surface layer. By providing through-holes on the resin layer or the glass resin layer, the surface height difference can be easily controlled by the thickness of the resin layer or the glass resin layer, and a desired height difference that cannot be obtained by conventional mechanical processings can be obtained. This pattern may be formed by using photolithography which, however, increases processing steps, whereas a desired pattern can be simply obtained by the method of the present invention.

The resin is preferably a (heat) curable resin having high hardness and heat resistance. Preferred examples thereof are a melamine resin and a phenolic resin.

The glass resin is produced by calcining a silicon compound such as $Si(OH)_4$ or other organic silicon compound to convert it into a silica-based material which mainly consists of $SiO_2$, but since organic substances can remain therein, it is called a glass resin. The silicon compound can be dissolved in a solvent for coating, especially spin coating, therefore, a flat surface can be provided. The calcination temperature may be relatively low.

The through-holes may be formed on the resin layer or the glass resin layer by patterning by means of photolithography after the formation of a flat resin layer or glass resin layer but in the present invention, they are preferably formed by coating a mixed solution containing a resin or a silicon compound, a component insoluble in the resin or silicon compound, preferably, liquid paraffin, and a solvent capable of dissolving both of these (a mixed solvent may be used), baking the coating to harden the resin or to convert the silicon compound to silica and at the same time removing the above-mentioned insoluble component (paraffin) by evaporation.

Figure 5A:
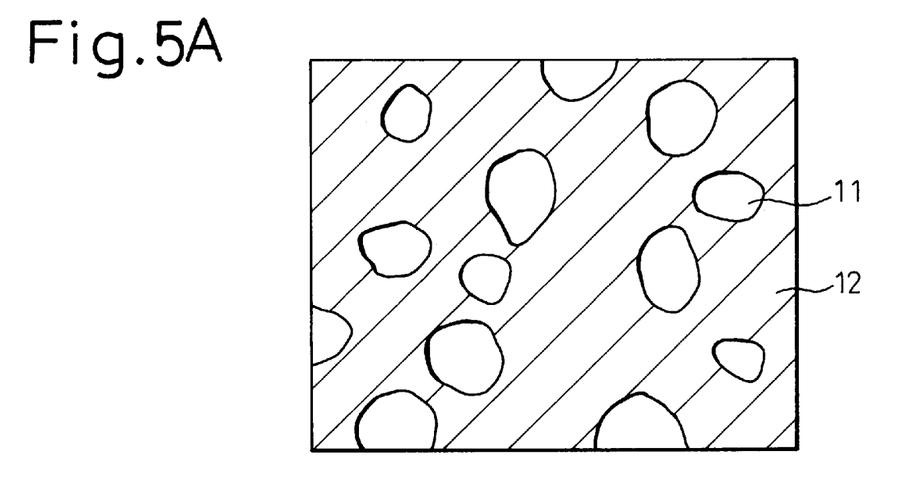
FIGS. 5A and 5B are, respectively, a plan view and a cross-sectional view of a resin or glass resin layer having through-holes.
Figure 5B:
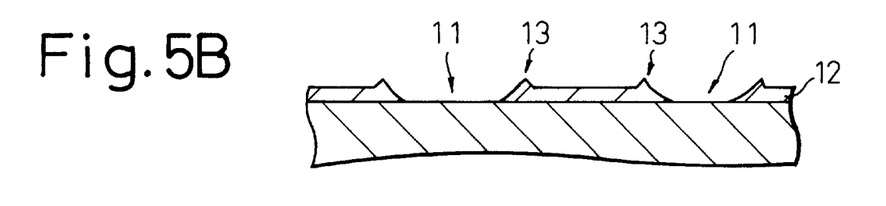

FIG. 5 shows a view of a resin layer or a glass resin layer 12 having through-holes 11 formed as above. The size of the through-hole is preferably on the order of from 1 to 10 µm and the total area of through-holes is preferably on the order of from 30 to 70% of the entire surface area. As shown in the cross section of FIG. 5, the resin layer remaining after the removal of an insoluble component (paraffin) has protrusions 13 on the periphery of through holes. The size and the total area of the through-holes can be controlled by changing the kind and amount of the respective components.

Figure 6:
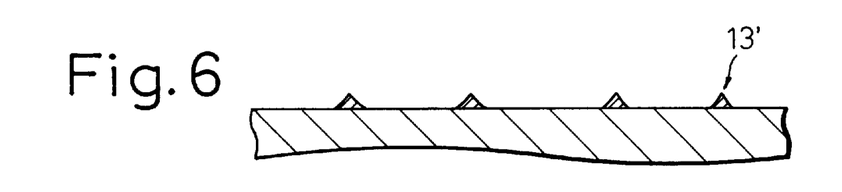
FIG. 6 shows a resin or glass resin layer in which only a protrusion part is remained.

The entire surface of the resin layer or glass resin layer thus formed may be subjected to etching to provide a non-flat layer in the pattern of rings where only protrusions 13' on the periphery of the through-holes remain (FIG. 6).

The thickness of the resin layer or the glass resin layer or the height of the protrusion part is preferably set so that a height difference of approximately from 100 to 200 Å is given on the top face of a magnetic recording medium, which is formed by reflecting the height difference on the resin layer or glass resin layer. For example, in the case of forming a resin layer or glass resin layer directly on a substrate, assuming that a recording layer and other layers are formed thereon in the thickness of about 1000 Å, the resin layer or glass resin layer must have a height difference of about 1.5 times the height difference which should appear on the top surface of the medium.

A metal layer having columnar protrusions or a resin or glass resin layer having through-holes may be freely formed on a substrate or on or between layers of a magnetic recording medium. However, in the case of forming an undercoat layer below a recording layer for improving the performance of the recording layer, the intervention of the metal layer or resin or glass resin layer between the undercoat layer and the recording layer nullifies the undercoat layer. Also, in the case of using one of these layer as a protective layer, a diamond-like carbon layer is preferably formed thereon, because of the low hardness of these layers, particularly a resin layer.

Figure 7:
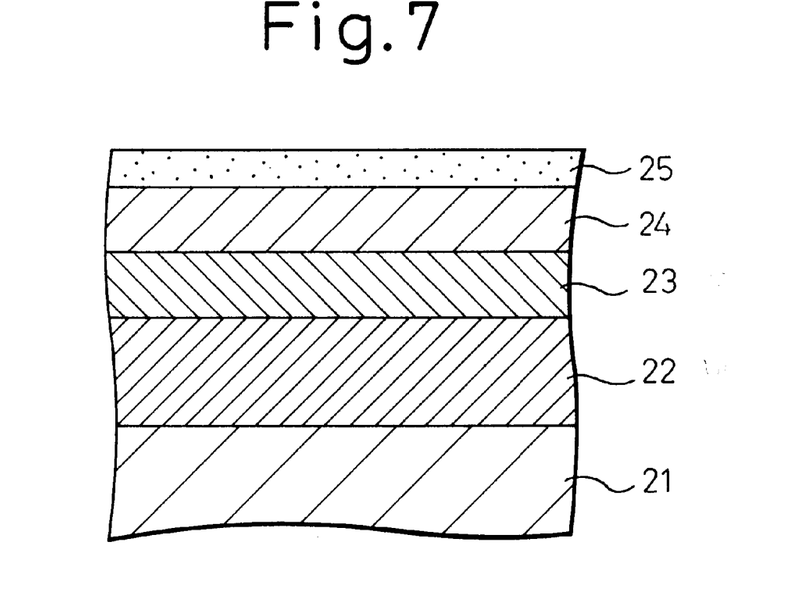
FIG. 7 shows a layer structure of a conventional magnetic disc medium.

FIG. 7 shows a layer structure of a representative magnetic recording medium. An undercoat layer 22 of Cr, a magnetic recording layer 23 of Co alloy, a protective layer 24 of diamond-like carbon (DLC) and a lubricating layer 25 of a lubricating oil are formed on a non-magnetic substrate 21 of Ni—P/Al. The layers 22 to 25 are of course not restricted to these compositions.

Figure 8:
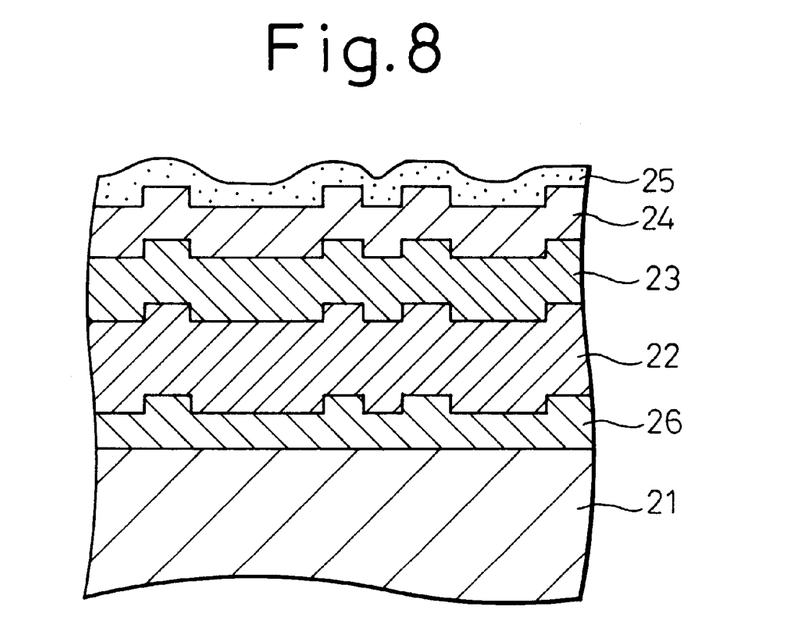
FIGS. 8 and 9 show a layer structure of a magnetic recording medium according to the present invention.

FIG. 8 shows an embodiment in which a non-flat surface layer 26 is interposed on a substrate 21 of the medium shown in FIG. 7.

Figure 9:
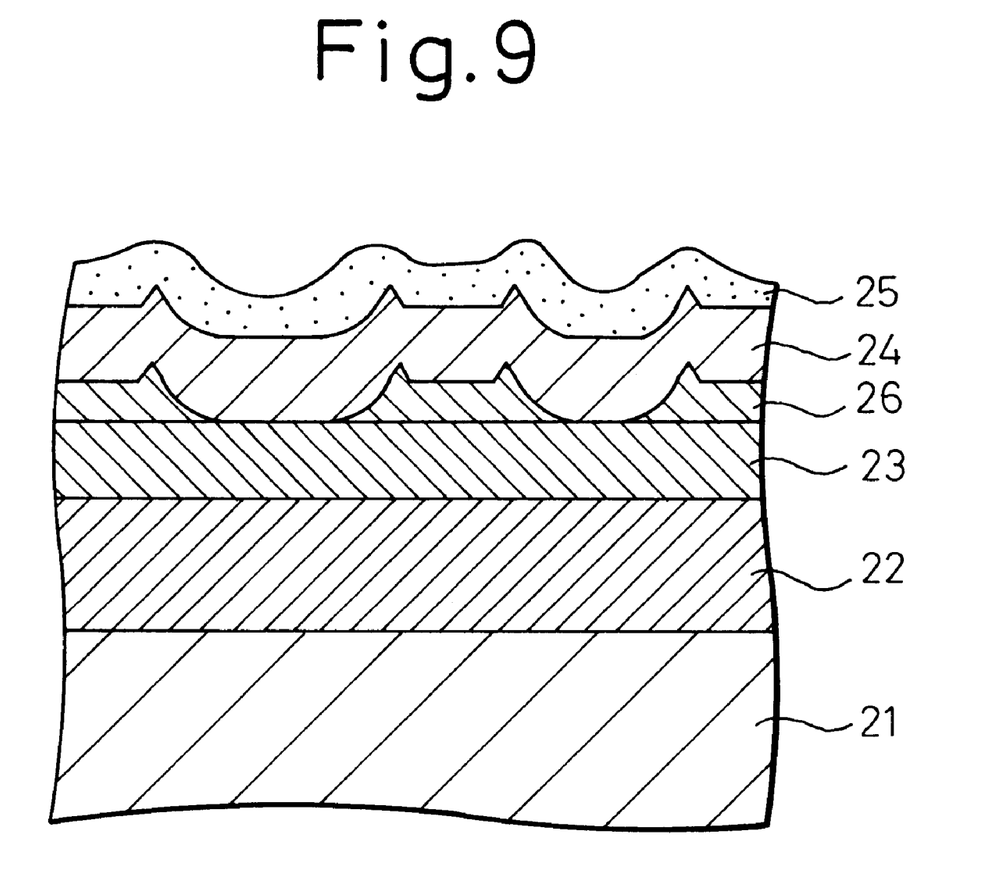

FIG. 9 shows an embodiment in which a non-flat surface layer 26 is interposed on a recording layer 23 and a DLC layer 24 is formed thereon.

As shown in FIG. 8, the non-flat surface layer may be formed on a substrate or, as shown in FIG. 9, the non-flat surface layer may be formed on a magnetic film. The non-flat surface layer on the substrate is advantageous in that since a protective layer alone is to be formed on the magnetic film, spacing between the magnetic recording head and the magnetic film is reduced, which is favorable in view of electromagnetical conversion properties. The non-flat surface layer on the magnetic recording film is advantageous in that since the same flat surface as of a substrate is present up to the magnetic film, an output fluctuation can be reduced. The application of either method is preferably determined according to the compatibility of the magnetic recording head. Depending on the compatibility of the head, the non-flat surface layer may also be used as a protective layer.

Further, since the magnetic recording head and the magnetic recording medium come into contact with each other only in a CSS zone and generate friction only at starting, the non-flat surface layer may be formed only on the CSS zone. For instance, in the case of forming the film by sputtering, surface roughness only on the CSS zone can be obtained by masking the areas other than the CSS zone during the film formation.

The present invention can also provide a magnetic disc device containing the above-mentioned magnetic recording medium.

Figure 10:
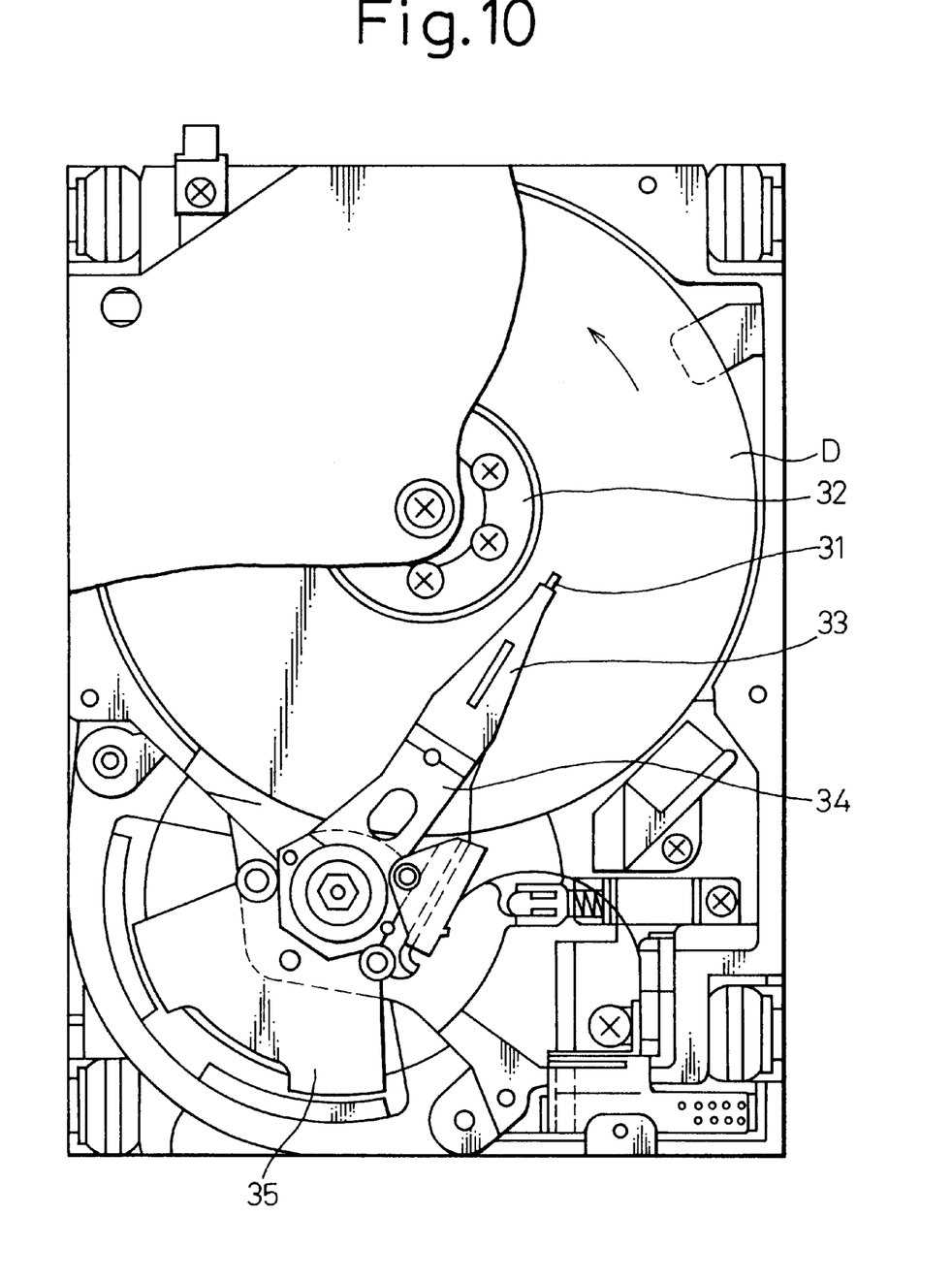
FIG. 10 shows a magnetic disc device as a whole.
Figure 11:
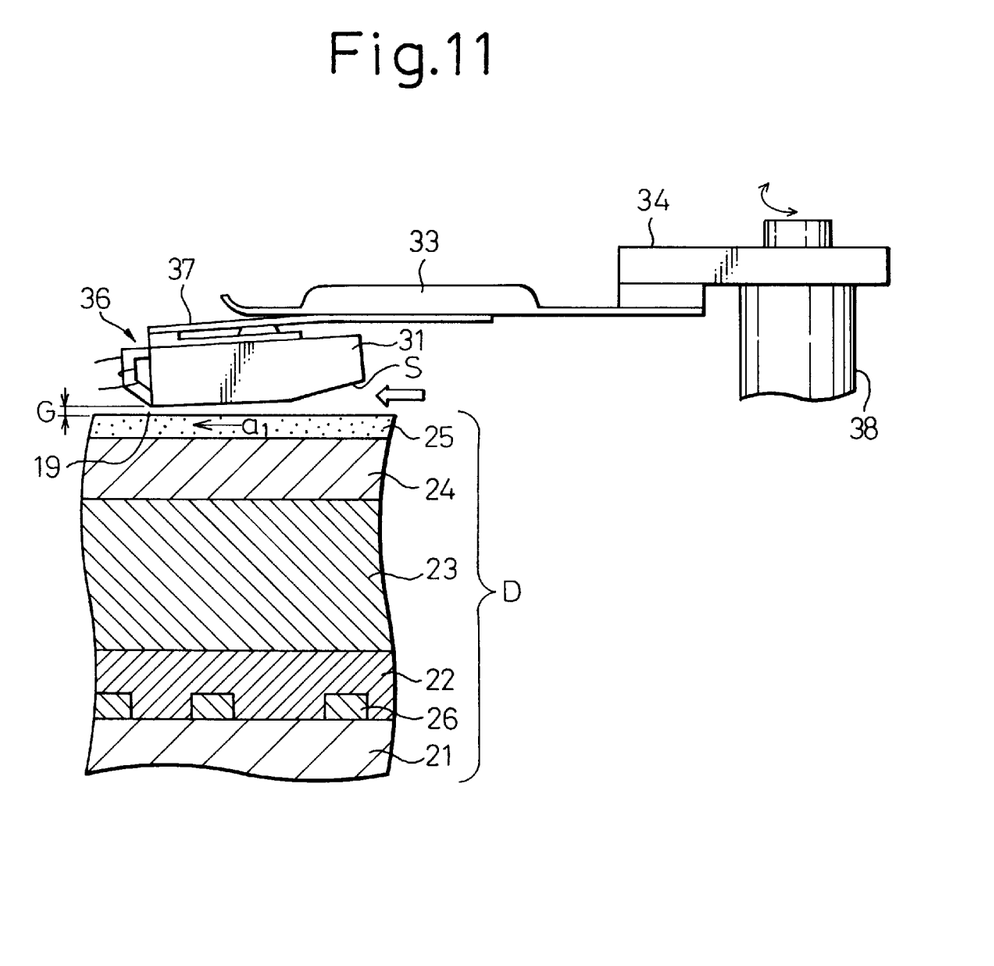
FIG. 11 shows the relationship between the magnetic head of a magnetic disc and the magnetic disc.

FIG. 10 is a plan view showing the whole internal structure of a magnetic disc device, in which a magnetic head 31 moves in the radius direction for seek operation to record/reproduce information, while a magnetic disc D rotates at high speed. In FIG. 10, 32 indicates a spindle, 33 indicates a suspension, 34 indicates a driving arm and 35 indicates a voice coil motor. FIG. 11 is an enlarged section view of the magnetic disc D cut at the position of magnetic head 31.

In the thin film type magnetic disc D, 22 to 26 are the same as those described above (see FIGS. 7 to 9).

The magnetic disc D is rotated in the direction of an arrow $a_1$ at a high speed, the magnetic head slider 31 flies due to the force of wind and, in this state, recording/reproducing of information is conducted on the magnetic disc D by head element 36. The slider 31 of the magnetic head is fixed to the suspension (spring arm) 33 through a gimbal 37 and the seek operation is conducted by the driving arm 34 of a carriage 38.

EXAMPLES

Example 1

Figure 12:
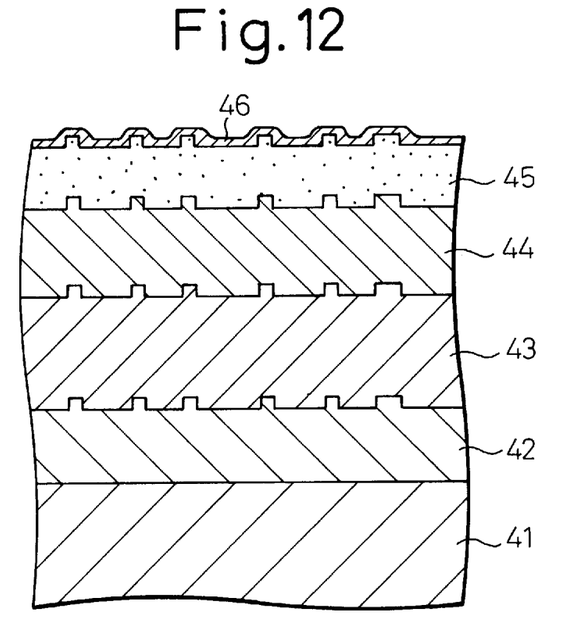
FIGS. 12 to 14, 15A, 15B and 16 to 22 show a magnetic recording medium according to Examples 1 to 10 of the present invention.

A magnetic recording medium of this example is described with reference to FIG. 12, which is a partially enlarged sectional view of the medium. The magnetic recording medium of this example is characterized in that columnar protrusions of a Ti film 42 are formed on a substrate 41.

A washed cylindrical Ni—P plated Al substrate 41 was set in a statically opposed type DC sputtering apparatus capable of forming a plurality of films, and all films up to a protective layer were formed in this apparatus without breaking a vacuum. More specifically, the substrate 41 was heated to 240° C. under a vacuum in the sputtering apparatus and, on the substrate, a Ti film 42, a Cr (chrome) film as an undercoat film 43, a CoCrPt (cobalt-chrome-platinum alloy) film as a magnetic film 44 and a C (carbon) film as a protective layer 45 were formed in this order by a DC magnetron sputtering using an Ar gas. At this time, the Ar gas pressure was fixed to 5 mTorr and the Ti film was formed to a thickness of 500 Å, the Cr film 500 Å, the CoCrPt film 200 Å and the C film 150 Å.

Thereafter, as a lubricating agent 46, a 10 Å thick film of perfluoropolyether was formed.

The thus produced magnetic recording medium was observed, from just above the surface thereof through an optical microscope and as a result, columnar protrusions as shown in FIG. 1 were observed. The columnar protrusions are in the form of circles having a diameter of about 2 μm and a height, determined by a tracer, of 10 nm.

On the examination of floating properties, the medium had a G. Height of 0.03 μm. For reference, in a texture obtained by a conventional machine processing, the G. Height could not be less than 0.06 μm.

On the CSS test, the friction coefficient of the medium was 0.5 or less even after the test was repeated 10,000 times.

Example 2

Figure 13:
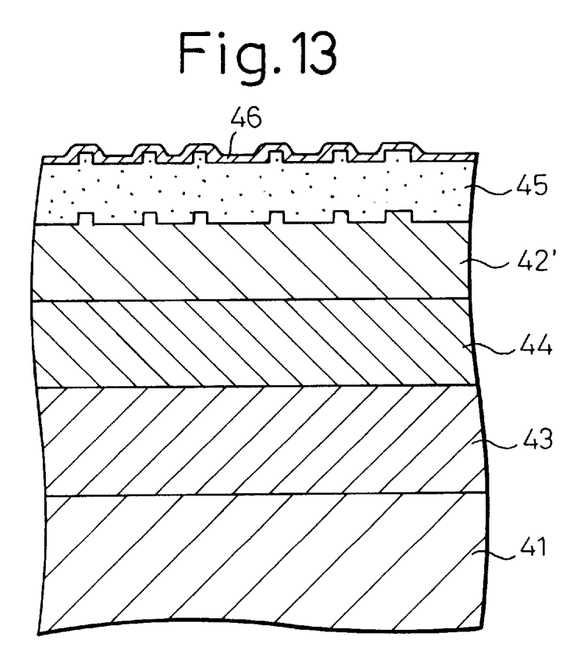

A magnetic recording medium of this example is described with reference to FIG. 13, which is a partially enlarged sectional view. The magnetic recording medium of this example is characterized in that columnar protrusions of a Ti film 42' are formed on a magnetic film 44.

A washed cylindrical Ni—P plated Al substrate 41 was set in a statically opposed type DC sputtering apparatus capable of forming a plurality of films, and the formation of all films up to a protective film was conducted in this apparatus without breaking the vacuum. More specifically, the substrate 41 was heated to 240° C. under a vacuum in the sputtering apparatus and, on the substrate, a Cr (chrome) film as an undercoat film 43, a CoCrPt (cobalt-chrome-platinum alloy) film as a magnetic film 44, a Ti film 42' and a C (carbon) film as a protective layer 45 were formed in this order using the DC magnetron sputtering and an Ar gas. At this time, the Ar gas pressure was fixed at 5 mTorr and the Cr film was formed to a thickness of 500 Å, the CoCrPt film 200 Å, the Ti film 500 Å and the C film 150 Å.

Thereafter, as lubricating agent 46, a 10 Å thick film of perfluoropolyether was formed thereon.

Upon examination of the floating property, the medium had a G. Height of 0.03 μm.

Also, on the CSS test, the friction coefficient was 0.5 or less even after the CSS test was repeated 10,000 times.

Example 3

Figure 14:
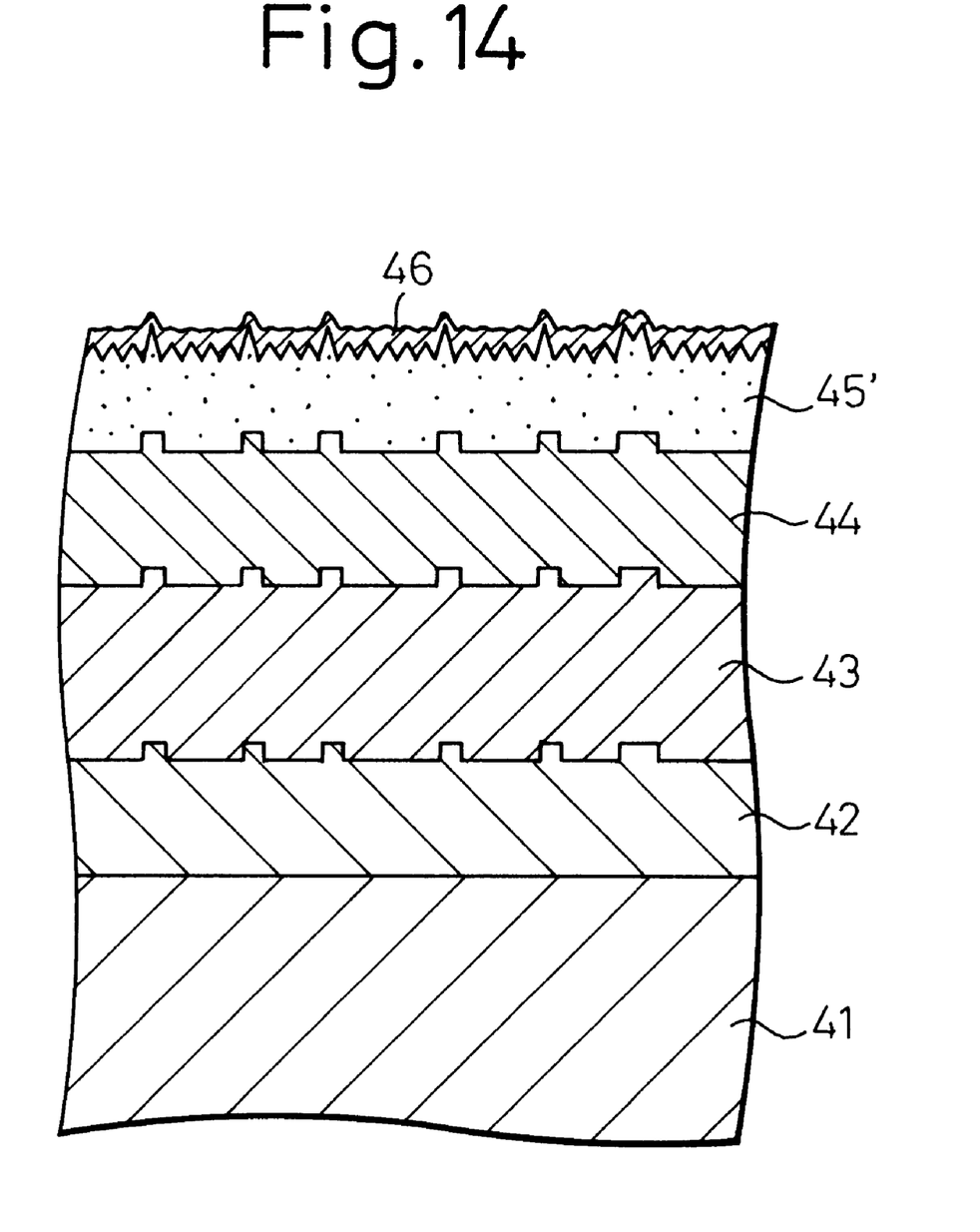

A magnetic recording medium of this example is described with reference to FIG. 14, which is a partially enlarged section view. The magnetic recording medium of this example is characterized in that columnar protrusions of a Ti film 42 were formed on a substrate 41, and an undercoat film 43, a magnetic film 44 and a protective film 45' were then formed thereon in this order and the surface of the protective film 45' was subjected to fine roughness treatment by plasma etching.

A washed cylindrical Ni—P plated Al substrate 41 was set in a statically opposed type DC sputtering apparatus capable of forming a plurality of films and all films up to a protective layer were formed in the apparatus without breaking the vacuum. More specifically, substrate 41 was heated to 240° C. under a vacuum in the sputtering apparatus and, on the substrate, a Ti film 42, a Cr (chrome) film as an undercoat film 43, a CoCrPt (cobalt-chrome-platinum alloy) film as a magnetic film 44 and a C (carbon) film as a protective film 45' were formed in this order according using DC magnetron sputtering and an Ar gas. At this time, the Ar gas pressure was fixed to 5 mTorr and the Ti film was formed to a thickness of 500 Å, the Cr film 500 Å, the CoCrPt film 200 Å and the C film 150 Å.

Then, plasma was generated in an oxygen atmosphere and the carbon of protective film 45' was gradually etched to finely roughen the surface.

Thereafter, as a lubricating agent 46, a 10 Å thick film of perfluoropolyether was formed thereon.

Upon examination of the floating property, the medium had a G. Height of 0.03 $\mu$m.

Further, on the CSS test, the friction coefficient was 0.3 or less even after the test was repeated 10,000 times.

Example 4

Figure 15A:
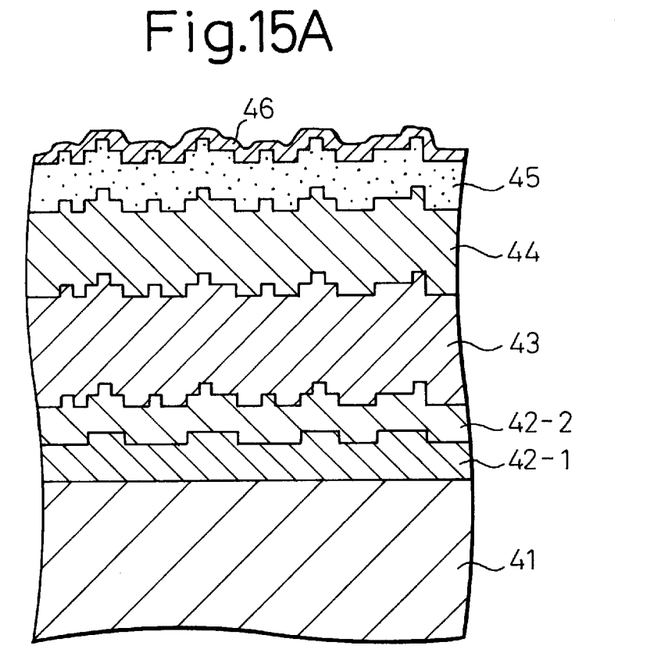

A magnetic recording medium of this example is explained with reference to FIGS. 15A and 15B, which are each a partially enlarged section view. The magnetic recording medium of this example is characterized in that columnar protrusions having a diameter of 5 $\mu$m and a height of 5 nm are provided by the first Ti film 42-1 formed on a substrate 41 and columnar protrusions having a diameter of 1 $\mu$m and a height of 10 nm are provided by the second Ti film 42-2 formed on the first film 42-1.

A washed cylindrical Ni—P plated Al substrate 41 was set in a statically opposed type DC sputtering apparatus capable of forming a plurality of films and the formation of all films up to a protective was conducted in this apparatus layer without breaking the vacuum. More specifically, the substrate 41 was heated to 240° C. under a vacuum in the sputtering apparatus and, using DC magnetron sputtering and an Ar gas, a first Ti film 42-1, a second Ti film 42-2, after changing the Ar gas pressure, a Cr (chrome) film as an undercoat film 43, a CoCrPt (cobalt-chrome-platinum alloy) film as a magnetic film 44 and a C (carbon) film as a protective layer 45 were formed thereon in this order. At this time, the Ar gas pressure was set to 5 mTorr excluding that for the second Ti film 42-2. The second Ti film 42-2 was formed at 30 mTorr. Then, the first Ti film 42-1 was formed to a thickness of 250 Å, the second Ti film 42-2 of 250 Å, the Cr film 43 of 500 Å, the CoCrPt film 44 in 200 Å and the C film 45 of 150 Å. Thereafter, as a lubricating agent 46, a 10 Å thick film of perfluoropolyether was formed thereon.

Upon examination of the floating property, the medium had a G. Height of 0.03 $\mu$m.

In the CSS test, the friction coefficient was 0.4 or less even after the CSS test was repeated 10,000 times.

Figure 15B:
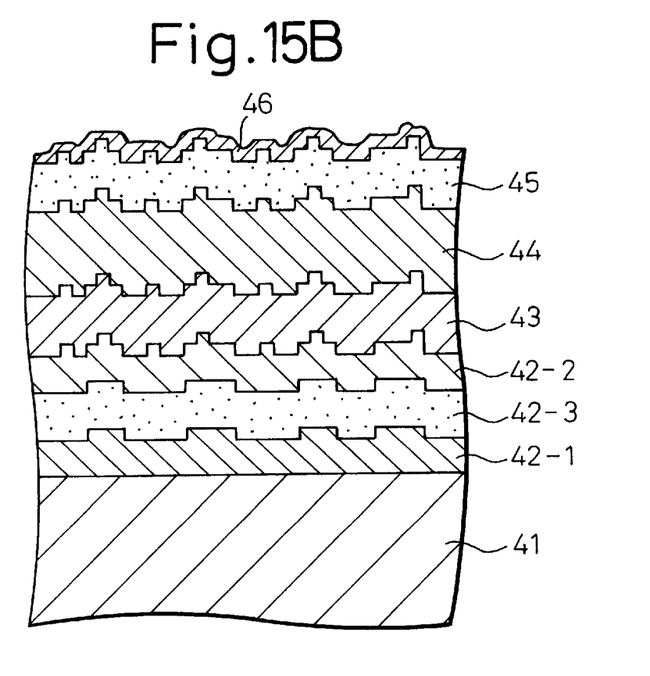

Note that if a foreign material, for example, an NiP layer 42-3 is interposed between the first Ti film 42-1 and the second Ti film 42-2, the growth condition of the second Ti film 42-2 can be easily controlled (FIG. 15B).

The present invention is by no means limited to the foregoing examples but may include the following.

The substrate material is not limited to the Ni—P plated Al substrate but any of a glass substrate, a Canacite glass ceramic substrate, a silicon substrate or a carbon substrate may be used. Here, in order to achieve a low floating height, the substrate preferably has a roughness as low as possible. A substrate having a center line average height (Ra) of 15 Å or less is preferably used.

In addition to the above-described sputtering, the film may be formed by vacuum evaporation or ion plating.

In the foregoing examples, although the substrate temperature was 240° C. during the Ti film formation, any temperature may be used as long as columnar protrusions can be formed. Also, the Ar gas pressure is not limited to 5 mTorr but any gas pressure may be used as long as discharge can be conducted and columnar protrusions can be formed.

The undercoat layer may be made of Mo, Ta or an alloy thereof in addition to Cr.

The magnetic layer may be an alloy comprising Co as a main component and further containing at least one element of Ni, Fe, Pt, Ta, Cr, P, W and Mo, or $Fe_2O_3$, having predetermined magnetic properties.

The protective layer may be made of $SiO_2$ or an organic polymer compound in addition to C.

Comparative Example

As a comparison to the foregoing examples, a medium having no roughened Ti film was evaluated. The magnetic recording medium of this example was prepared in the same manner as described above and only the difference from the examples according to the present invention is the absence of a roughened Ti film.

A washed cylindrical Ni—P plated Al substrate was set in a statically opposed type DC sputtering apparatus capable of forming a plurality of films and the formation of all films up to a protective film was conducted in this apparatus without breaking the vacuum. More specifically, a substrate was heated to 240° C. under a vacuum in the sputtering device and, on this substrate, a Cr (chrome) film as an undercoat film, a CoCrPt (cobalt-chrome-platinum alloy) film as a magnetic film and a C (carbon) film as a protective layer were formed in this order using DC magnetron sputtering and an Ar gas. At this time, the Ar gas pressure was fixed to 5 mTorr and the Cr film was formed to a thickness of 500 Å, the CoCrPt film at 200 Å and the C film at 150 Å.

Thereafter, as a lubricating agent, a 10 Å thick film of perfluoropolyether was formed thereon.

Upon examination of the floating property, the medium had a G. Height of 0.03 $\mu$m.

In the CSS test, adsorption was occurred at the first operation and the friction coefficient was 3.0.

This results were ascribable to very high friction even though the floating property lay at the same level with the examples of the present invention.

Example 5

Figure 16:
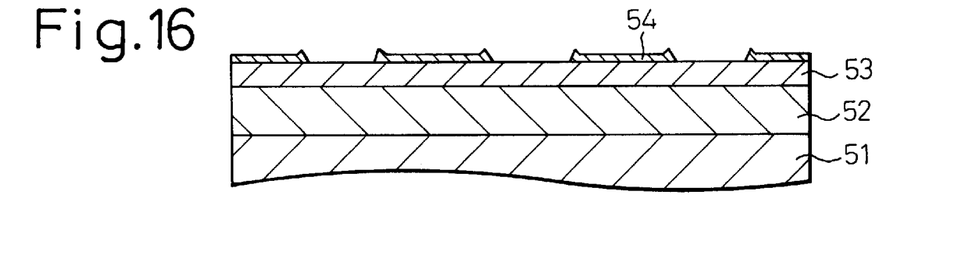

In FIG. 16, a Cr undercoat film 52 and a CoCrTa magnetic film 53 were formed in this order on a NiP plated, mirror-finished Al substrate 51. A resin film 54 having through-holes was formed on the CoCrTa film and a lubricating agent was coated thereon.

The undercoat film 52 and the magnetic film 53 were formed by sputtering to have a thickness of 100 Å and 500 Å, respectively. The sputtering conditions were such that the gas pressure was 10 mTorr and the substrate temperature was 200° C. in either case and the power density was 5.5 W/cm$^2$ for the Cr film and 3.0 W/cm$^2$ for the CoCrTa film. The resin film 54 was made of a phenolic resin and had a film thickness of 200 Å on the flat area, a protrusion height of 300 Å, an average through-hole diameter of 2 μm and a ratio of the total area of the through-holes to the entire plane area of 40%. The resin film 54 was formed by coating a phenolic resin and a small amount of paraffin which had been diluted with an organic solvent such as methyl ethyl ketone or alcohol on the medium by spin coating and then heat treated in a baking furnace at 180° C. for 30 minutes. The film thickness, the protrusion height and the density can be controlled by the resin concentration, the paraffin concentration and the coating condition. Then, a PFPE (perfluoropolyether) based lubricating agent (not shown) was coated on the medium comprising the resin film 54 having through-holes.

The surface roughness of the resulting medium was 0.01 μm in terms of Rmax and the medium was free of head adsorption and favored with an excellent friction property.

Example 6

Figure 17:
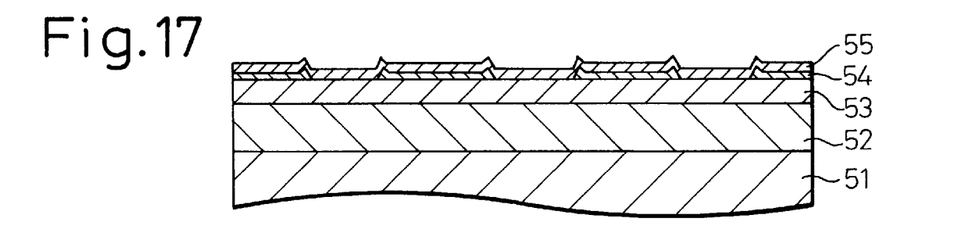

In FIG. 17, a medium was prepared in the same manner as in Example 5 except that after the resin film 54 was formed, a DLC (diamond-like carbon) film 55 was formed to a thickness of 100 Å and a PFPE based lubricating agent was coated on the DLC film 55. The resulting medium was superior to the medium of Example 5 in the abrasion resistance (wear resistance) due to the presence of the DLC film 55.

When, after forming the resin film, only the portions protruding at the peripheries of the through holes in the resin film were left by applying O$_2$ plasma treatment. A DLC film was formed on the treated resin film. The height difference in the film can be controlled and a thin protective layer can be achieved, so that a space between the head and the medium can be reduced and a high density recording can be conducted while maintaining a good friction property and abrasion resistance.

Example 7

Figure 18:
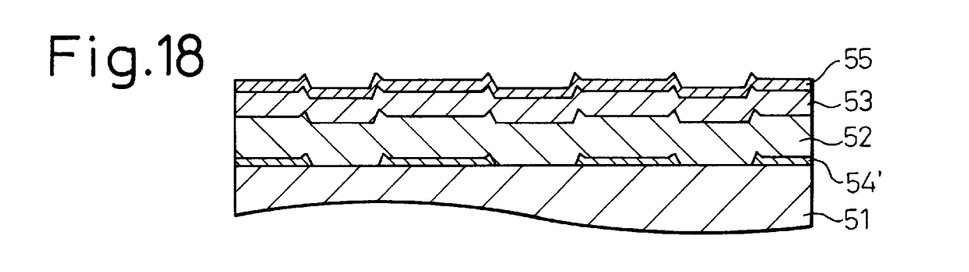
Figure 19:
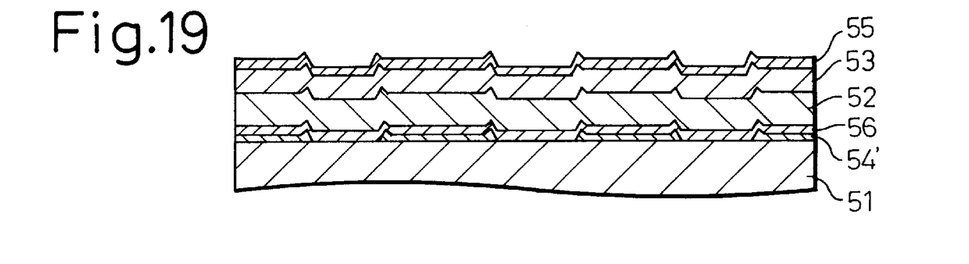

In FIG. 18, a resin film 54' having through-holes, a Cr undercoat film 52, a CoCrTa magnetic film 53 and a DLC protective film 55 were formed in this order on a NiP plated, mirror-finished Al substrate. The forming conditions in each case were the same as in Example 5. In the processing of this example, after the formation of the resin film, the conventional film formation processes can be utilized. When, as shown in FIG. 19, a film 56 made of an inorganic oxide such as SiO$_2$, TiO$_2$, CrO$_2$, ZrO$_2$ or Al$_2$O$_3$ or of a high crystalline orientation metal film such as Ti, TiSi or TiY is formed on the resin film 54', the crystallinity of Cr undercoat layer is improved and a CoCrTa recording layer having good magnetic properties can be obtained.

As described in the foregoing, the media of Examples 5 to 7 each had through-holes with a surface roughness (Rmax) of 0.005 to 0.02 μm and showed excellent frictional property and abrasion resistance. In these examples, although an aluminum substrate was used as the substrate, the effect is greater when a glass, a ceramic or a carbon substrate, which can be finished to a more complete mirror finish, is used. Also, although a phenol resin was used as the resin film, a melamine resin and the like may be used. Further, as a matter of the layer structure, a CoPt based magnetic film which can dispense with a Cr undercoat layer may also be used. Furthermore, although a carbon-based film was used as the protective film, a sputtered SiO$_2$ film or the like may also be used.

Example 8

Figure 20:
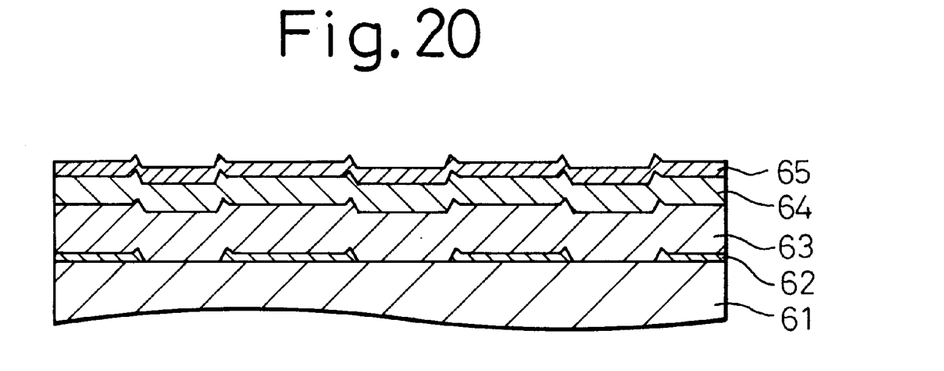

In FIG. 20, a glass resin film 62 having through-holes was formed on a NiP plated, mirror-finished aluminum substrate 61, and, then, a Cr undercoat film 63, a CoCrTa magnetic film 64 and a carbon protective film 65 were formed thereon in this order. A lubricating agent was then coated thereon.

The Cr undercoat film 63 and the CoCrTa magnetic film 64 were formed by sputtering to have a thickness of 1000 Å and 500 Å, respectively. The sputtering conditions were such that the gas pressure was 10 mTorr and the substrate temperature of 200° C. in either case and the power density was 5.5 W/cm$^2$ for the Cr film and 3.0 W/cm$^2$ for the CoCrTa film. The glass resin of the film 62 is represented by Si(OH)$_4$ or Si(OR)$_4$ and converted into SiO$_2$ by heat treatment calcining, where the film thickness was 0.02 μm on the flat portion, the protrusion height was 0.03 μm, the size of the through-holes was from 1 to 5 μm and the ratio of the total area of the through-holes to the entire surface area was 40%. Specifically, the glass resin film 62 was formed by coating an Si(OH)$_4$ solution and a modicum of paraffin which had been diluted with an organic solvent such as alcohol on the medium by spin coating and then heat treated in a baking furnace at 250° C. for 30 minutes. The film thickness, the protrusion height and the density can be controlled by the Si(OH)$_4$ solution concentration, the paraffin concentration and the coating condition. Then, a PFPE (perfluoropolyether) based lubricating agent was coated on the resulting medium comprising the glass resin layer 62 having through-holes.

The surface roughness of this medium was 0.01 μm in terms of Rmax and the medium was free of head adsorption and favored with an excellent wear property.

Example 9

Figure 21:
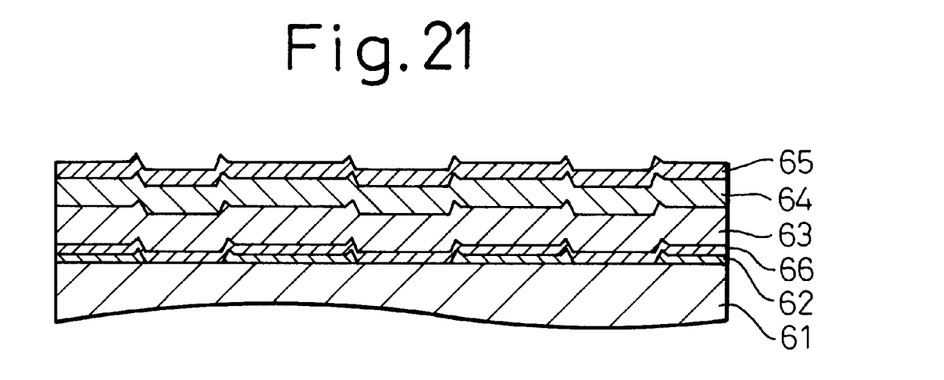

In FIG. 21, a medium was prepared in the same manner as in Example 8 except that after the glass resin film 62 was formed, a Ti layer 66 was formed thereon. The Ti layer 66 was a film having an aligned crystalline orientation and the protrusion was not formed. The formation of Ti layer 66 accelerates the crystal growth of the Cr undercoat layer 63 and thereby the magnetic property of CoCrTa is improved.

Example 10

Figure 22:
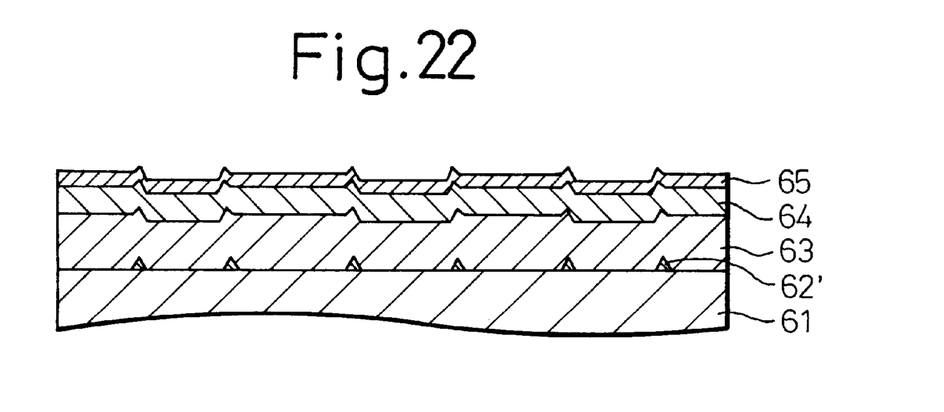

In FIG. 22, a glass resin film 62 having through-holes was formed on a NiP-plated, mirror-finished aluminum substrate 61 and after ion etching, a Cr undercoat film, a CoCrTa magnetic film, and a DLC protective film were formed thereon in this order. The glass resin film 62' having a protruding portions only in the periphery of through-holes can be formed by the ion etching and thereby, the height difference can be controlled.

As described in the foregoing, the media of Example 8 to 10 each had a height difference of from 0.005 to 0.02 μm in terms of a surface roughness (Rmax) and accordingly, they were excellent in frictional property and abrasion resistance (wear characteristics). In these examples, although an aluminum substrate was used as the substrate, the effect is greater when a glass, ceramic or carbon substrate which can be finished to a more complete mirror finish, is used. Also, as a matter of the layer structure, a CoPt based magnetic film which can dispense with a Cr undercoat layer may also be used. Further, although a carbon was used as a protective film, a sputtered $SiO_2$ film may also be used.

We claim:

1. The magnetic recording medium comprising a substrate, a magnetic recording layer, and a protecting layer, respectively arranged in order, said medium further comprising a metal layer having a plurality of irregularly distributed columnar protrusions extending therefrom, said metal layer being positioned between said substrate and said protecting layer, and said protecting layer having a surface with a profile which reflects said irregularly distributed columnar protrusions of said metal layer, and wherein said columnar protrusions have different crystalline structures and/or different crystal orientations from the remainder of said metal layer.

2. A magnetic recording medium comprising a substrate, a magnetic recording layer, and a protecting layer, respectively arranged in order, said medium further comprising a resin layer having a plurality of irregularly distributed through-holes, said resin layer being positioned between said substrate and said protecting layer, and said protecting layer having a surface with a profile which reflects said irregularly distributed through-holes of said resin layer.

3. A magnetic recording medium comprising a substrate, a magnetic recording layer, and a protecting layer, respectively arranged in order, said medium further comprising a resin layer composed of a plurality of irregularly distributed annular elements, said resin layer being positioned between said substrate and said protecting layer, said protecting layer having a surface with a profile which reflects said irregularly distributed annular elements of said resin layer.

4. The magnetic recording medium as claimed in claim 1, wherein said metal layer is titanium or a titanium alloy.

5. The magnetic recording medium as claimed in claim 1, wherein said columnar protrusions have a plurality of diameters and/or heights.

6. The magnetic recording medium as claimed in claim 1, wherein said columnar protrusions each have an approximate height of from 5 to 50 nm.

7. The magnetic recording medium as claimed in claim 1, wherein said metal layer comprises multiple metal layers made of one material, and further wherein a foreign material layer made of a material different than said one material is interposed between said multiple metal layers made of said one material.

8. The magnetic recording medium as claimed in claim 1, wherein said protective layer comprises a diamond-like carbon layer.

9. The magnetic recording medium as claimed in claim 1, wherein said recording layer is configured and arranged to oppose a recording and/or reproducing head, and further wherein the recording and/or reproducing head is part of a contact-start-stop system.

10. The magnetic recording medium of claim 1, wherein said magnetic recording medium further comprises a magnetic recording disk.

11. The magnetic recording medium as claimed in claim 1 wherein said metal layer comprises a first metal layer and a second metal layer positioned above said first metal layer, and further wherein said columnar protrusions comprise first columnar protrusions extending from said first metal layer and second columnar protrusions extending from said second metal layer whereby said first columnar protrusions influence said second metal layer.

12. The magnetic recording medium as claimed in claim 5, wherein said columnar protrusions each have an approximate diameter of from 0.2 to 20 $\mu$m an approximate height of from 5 to 50 nm.

13. The magnetic recording layer as claimed in claim 2, wherein said resin layer is provided on said substrate and upon said resin layer are a layer made of an inorganic oxide or an orientated crystalline metal, a Cr undercoat layer and a Co alloy magnetic recording layer.

14. The magnetic recording medium as claimed in claim 2, wherein said resin layer has protrusions at peripheries thereof defining said through-holes.

15. The magnetic recording medium as claimed in claim 2, wherein the total area of said through-holes accounts for approximately from 30 to 70% of the whole area of said resin layer.

16. The magnetic recording medium as claimed in claim 14, wherein said magnetic recording medium has protrusions of from approximately 5 to 20 nm on an outer surface thereof corresponding to said protrusions on said resin layer.

17. The magnetic recording medium as claimed in claim 2, wherein said protective layer comprises a diamond-like carbon layer.

18. The magnetic recording layer as claimed in claim 2, wherein said resin layer is provided on said substrate and upon said resin layer are a layer made of an inorganic oxide or an oriented crystalline metal, a Cr undercoat layer and a Co alloy magnetic recording layer.

19. The magnetic recording medium defined in claim 2 wherein said resin is a glass resin.

20. The magnetic recording medium as claimed in claim 2, wherein said recording layer is configured and arranged to oppose a recording and/or reproducing head, and further wherein the recording and/or reproducing head is part of a contact-start-stop system.

21. The magnetic recording medium as claimed in claim 2, wherein said magnetic recording medium further comprises a magnetic recording disk.

22. The magnetic recording medium defined in claim 3 wherein said resin is a glass resin.

23. The magnetic recording layer as claimed in claim 3, wherein said resin layer is provided on said substrate and upon said resin layer are a layer made of an inorganic oxide or an orientated crystalline metal, a Cr undercoat layer and a Co alloy magnetic recording layer.

24. The magnetic recording medium as claimed in claim 3, wherein said magnetic recording medium has protrusions of from approximately 5 to 20 nm on an outer surface thereof corresponding to said irregularly distributed annular elements of said resin layer.

25. The magnetic recording medium as claimed in claim 3, wherein said protective layer comprises a diamond-like carbon layer.

26. The magnetic recording layer as claimed in claim 3, wherein said resin layer is provided on said substrate and upon said resin layer are a layer made of an inorganic oxide or an oriented crystalline metal, a Cr undercoat layer and a Co alloy magnetic recording layer.

27. The magnetic recording medium as claimed in claim 3, wherein said recording layer is configured and arranged to oppose a recording and/or reproducing head, and further wherein the recording and/or reproducing head is part of a contact-start-stop system.

28. The magnetic recording medium as claimed in claim 3, wherein said magnetic recording medium further comprises a magnetic recording disk.

5,914,168

* * * * *